(12) United States Patent
Klaiber et al.

(10) Patent No.: US 7,707,341 B1
(45) Date of Patent: Apr. 27, 2010

(54) VIRTUALIZING AN INTERRUPT CONTROLLER

(75) Inventors: Alexander C. Klaiber, Mountain View, CA (US); William Alexander Hughes, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1435 days.

(21) Appl. No.: 11/066,051

(22) Filed: Feb. 25, 2005

Related U.S. Application Data

(60) Provisional application No. 60/569,995, filed on May 11, 2004.

(51) Int. Cl.
*G06F 12/00* (2006.01)
*G06F 13/24* (2006.01)

(52) U.S. Cl. ............... 710/244; 710/260; 710/262
(58) Field of Classification Search .......... 710/260, 710/262, 244
See application file for complete search history.

(56) References Cited

U.S. PATENT DOCUMENTS

| | | | | |
|---|---|---|---|---|
| 4,400,769 | A * | 8/1983 | Kaneda et al. | 710/267 |
| 4,787,031 | A | 11/1988 | Karger et al. | |
| 5,361,375 | A * | 11/1994 | Ogi | 718/1 |
| 5,790,895 | A | 8/1998 | Krontz et al. | |
| 5,826,084 | A | 10/1998 | Brooks et al. | |
| 6,298,410 | B1 * | 10/2001 | Jayakumar et al. | 710/266 |
| 6,883,053 | B2 * | 4/2005 | Shinagawa et al. | 710/263 |
| 6,895,491 | B2 | 5/2005 | Kjos et al. | |
| 7,000,051 | B2 | 2/2006 | Armstrong et al. | |
| 7,051,138 | B2 * | 5/2006 | Yang | 710/260 |
| 7,209,994 | B1 | 4/2007 | Klaiber et al. | |
| 7,222,204 | B2 * | 5/2007 | Athanassiadis | 710/264 |
| 7,281,075 | B2 * | 10/2007 | Armstrong et al. | 710/267 |
| 7,305,588 | B2 * | 12/2007 | Athanassiadis | 714/34 |
| 7,484,024 | B2 * | 1/2009 | Kwon et al. | 710/264 |
| 2003/0217250 | A1 | 11/2003 | Bennett et al. | |
| 2004/0117532 | A1 | 6/2004 | Bennett et al. | |
| 2004/0117583 | A1 | 6/2004 | Arimilli | |
| 2004/0117587 | A1 | 6/2004 | Arimilli | |
| 2004/0205272 | A1 | 10/2004 | Armstrong et al. | |
| 2005/0076186 | A1 | 4/2005 | Traut et al. | |
| 2005/0273605 | A1 | 12/2005 | Saha et al. | |

OTHER PUBLICATIONS

Intel, 8259A Programmable Interrupt Controller (8259A/8259A-2), Dec. 1988, Intel.*
P.H. Gum, "System/370 Extended Architecture: Facilities for Virtual Machines," IBM J. Res Develop., vol. 27, No. 6, Nov. 1983, (pp. 530-544).
"Operating System Writer's Guide," Pentium Pro Family Developer's Manual, vol. 3, 1996, (12 Pages).

(Continued)

*Primary Examiner*—Mark Rinehart
*Assistant Examiner*—Christopher A Daley
(74) *Attorney, Agent, or Firm*—Lawrence J. Merkel; Meyertons, Hood, Kivlin, Kowert & Goetzel, P.C.

(57) ABSTRACT

In one embodiment, a method is contemplated. An interrupt is received in a processor from an interrupt controller. Responsive to receiving the interrupt, the interrupt is masked in the interrupt controller to permit another interrupt to be transmitted by the interrupt controller to the processor. The other interrupt has a lower priority than the previously-received interrupt in the interrupt controller.

20 Claims, 10 Drawing Sheets

OTHER PUBLICATIONS

James L. Turley, "Advanced 80386 Programming Techniques," ISBN 0-07-881342-5, (35 Pages).
82093AA I/O Advanced Programmable Interrupt Controller (IOPIC), Intel Corporation, May 1996, (20 Pages).
"8259A Programmable Interrupt Controller (8259A/8259A-2)," Intel Corporation, Dec. 1988, (24 Pages).
House, R. "Choosing the right software for data acquisition" [Online] National Instruments Corporation, Austin, TX Publication date: May 1995 vol. 32, Issue 5 Posted online Aug. 6, 2002 URL: http://ieeexplorer.ieee.org/search.

* cited by examiner

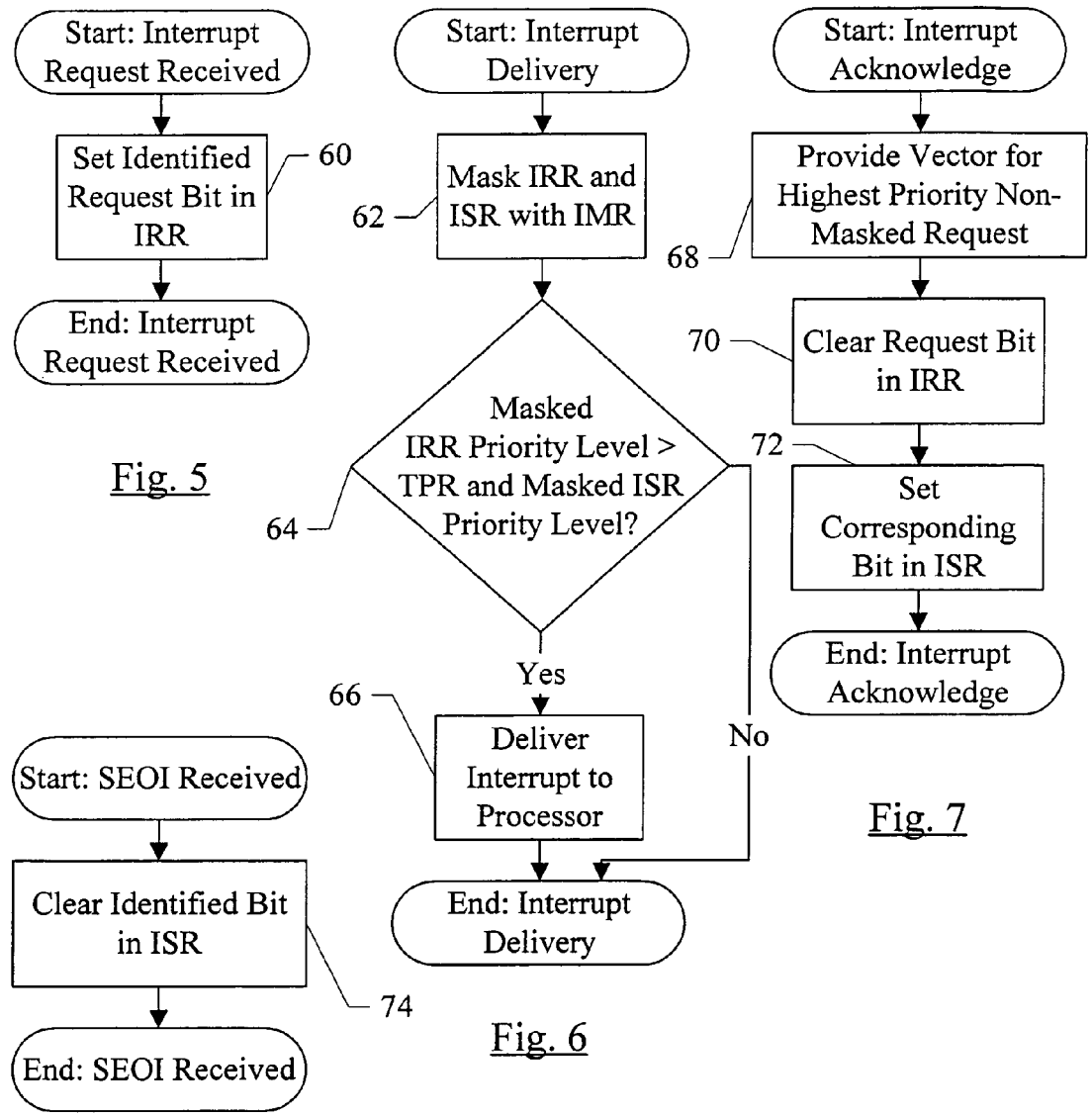

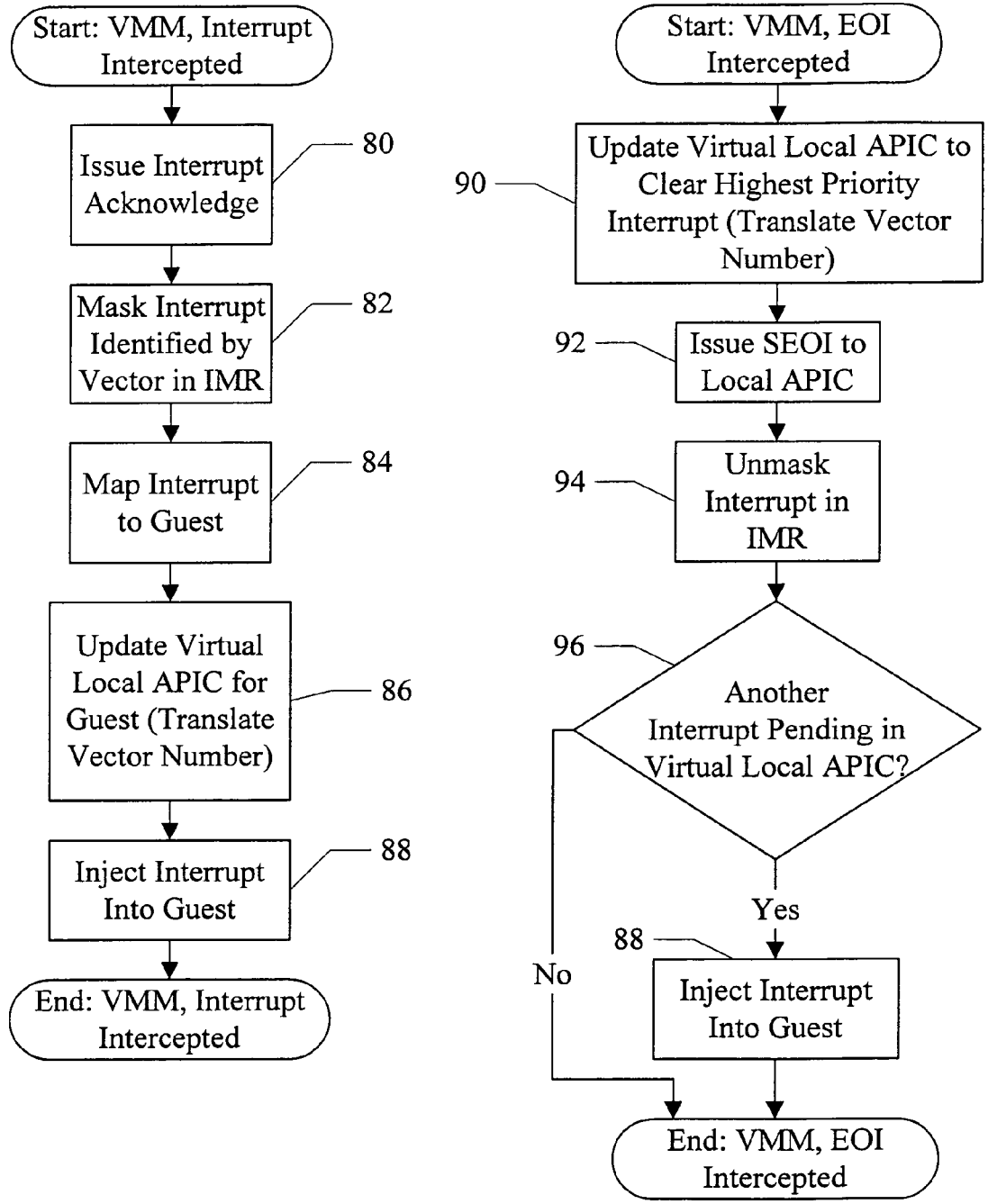

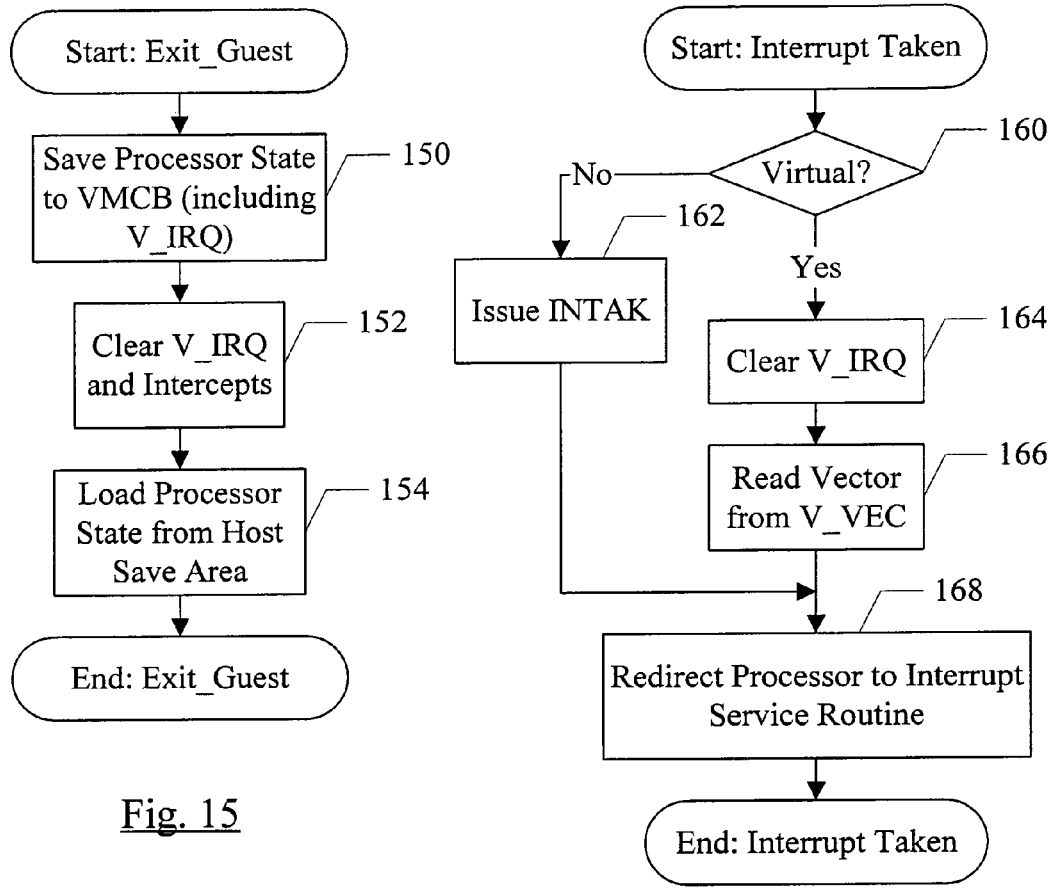
Fig. 15
Fig. 16
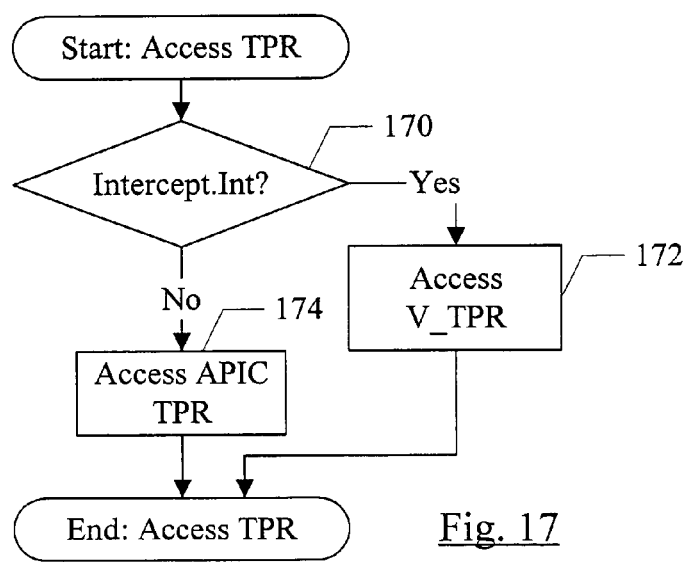
Fig. 17

VIRTUALIZING AN INTERRUPT CONTROLLER

This application claims benefit of priority to U.S. Provisional Patent Application Ser. No. 60/569,995, filed on May 11, 2004.

BACKGROUND

1. Field of the Invention

This invention relates to virtualization and the use of virtual machines in processors and computer systems and, more particularly, to virtualizing an interrupt controller.

2. Description of the Related Art

Virtualization has been used in computer systems for a variety of different purposes. For example, virtualization may be used to execute privileged software in a "container" to prevent the privileged software from directly accessing and/or making changes to at least some of the physical machine state without first being permitted to do so by a virtual machine manager that controls the virtual machine. Such a container may prevent "buggy" or malicious software from causing problems on the physical machine. Additionally, virtualization may be used to permit two or more privileged programs to execute on the same physical machine concurrently. The privileged programs may be prevented from interfering with each other since access to the physical machine is controlled. Privileged programs may include operating systems, and may also include other software which expects to have full control of the hardware on which the software is executing. In another example, virtualization may be used to execute a privileged program on hardware that differs from the hardware expected by the privileged program.

Generally, virtualization of a processor or computer system may include providing one or more privileged programs with access to a virtual machine (the container mentioned above) over which the privileged program has full control, but the control of the physical machine is retained by the virtual machine manager. The virtual machine may include a processor (or processors), memory, and various peripheral devices that the privileged program expects to find in the machine on which it is executing. Each privileged program (and related software in some cases, such as the applications that execute on an operating system) may be referred to herein as a guest. Virtualization may be implemented in software (e.g. the virtual machine manager (VMM) mentioned above) without any specific hardware virtualization support in the physical machine on which the VMM and its virtual machines execute. However, virtualization may be simplified and/or achieve higher performance if some hardware support is provided.

In some cases, all of the peripheral devices that a guest interacts with are virtualized. That is, the VMM provides a software model of the peripheral device with which the guest interacts. The VMM interfaces to the corresponding physical device (if any) on behalf of the guest, or emulates operation of the peripheral device is no corresponding physical device exists in the computer system. Any interrupts generated by the physical device may generally be handled by the VMM as well in these cases.

In other cases, a guest may be permitted to directly interact with one or more physical peripheral devices in the computer system. If a guest directly interacts with a physical device, the guest will typically handle any interrupts generated by that device. Each guest may presume that it has full access to its own dedicated interrupt controller. A mechanism for sharing the interrupt controller among multiple guests may be needed if guests may interact directly with one or more physical peripheral devices. For example, an interrupt that is to be serviced by one guest should not be indefinitely blocked by a higher priority interrupt being serviced by another guest.

Additionally, the VMM may need to be able to inject interrupts into a guest. Typically, the VMM must determine if the guest's virtual processor is in a state that would permit the interrupt to be taken if the guest were executing on the physical machine. The checking may include examining various state that may prevent interrupts from being taken (e.g. interrupt enables), as well as examining which instructions have recently been executed in the virtual machine. If the guest's virtual processor would take the interrupt, the VMM then physically modifies the state of the guest's virtual machine. The modifications change the state of the virtual machine to the state that would result if the processor had taken an interrupt. For example, execution of the currently executing program may be suspended; some amount of state related to the currently executing program may be saved (as specified by the processor's architecture), such as the current program counter; other processor state that would be changed on taking an interrupt may be changed (e.g. processor mode registers); and the program counter may be changed to the address of the first instruction in the interrupt handler. Such direct state modification may generally be complicated and error prone, in addition to being fairly slow as a large amount of state may need to be changed. Furthermore, and in some cases a larger issue than the state modification, may be checking for whether or not interrupts are enabled. The VMM generally must intercept all operations that can change the "interrupt enables" whenever a virtual interrupt is pending, until the interrupt is finally taken. In some architectures, such as x86, numerous operations would be intercepted.

SUMMARY

In one embodiment, a method is contemplated. An interrupt is received in a processor from an interrupt controller. Responsive to receiving the interrupt, the interrupt is masked in the interrupt controller to permit another interrupt to be transmitted by the interrupt controller to the processor. The other interrupt has a lower priority than the previously-received interrupt in the interrupt controller.

In another embodiment, a computer accessible medium stores a plurality of instructions comprising instructions which, when executed on a processor in response to the processor intercepting an interrupt from an interrupt controller, mask the interrupt in the interrupt controller. Masking the interrupt may permit another interrupt to be transmitted by the interrupt controller to the processor, the other interrupt having a lower priority than the interrupt.

In still another embodiment, an interrupt controller comprises an interrupt request register, an interrupt service register, an interrupt mask register, and a control unit. The interrupt request register is configured to store a plurality of interrupt request indications. Each interrupt request indication is indicative of whether or not an interrupt is requested at an interrupt vector corresponding to that interrupt request indication. The interrupt service register is configured to store a plurality of interrupt service indications. Each interrupt service indication corresponds to a respective interrupt request indication and is indicative of whether or not the interrupt is in service in a processor to which the interrupt controller is coupled during use. The interrupt mask register is configured to store a plurality of mask indications. Each mask indication corresponds to a respective interrupt request indication of the plurality of interrupt request indications and indicative of whether or not the respective interrupt request indication and a respective interrupt service indication is to be masked. The control unit is coupled to the interrupt request register, the interrupt service register, and the interrupt mask register. The control unit is configured to selectively cause an interrupt of the processor responsive to at least: the plurality of interrupt request indications masked by the plurality of mask indications; and the plurality of interrupt service indications masked by the plurality of mask indications.

BRIEF DESCRIPTION OF THE DRAWINGS

The following detailed description makes reference to the accompanying drawings, which are now briefly described.

FIG. 5 is a flowchart illustrating operation of one embodiment of a control unit shown in FIG. 4 in response to receiving an interrupt request.

FIG. 6 is a flowchart illustrating operation of one embodiment of the control unit shown in FIG. 4 to deliver an interrupt to the processor.

FIG. 7 is a flowchart illustrating operation of one embodiment of the control unit shown in FIG. 4 in response to receiving an interrupt acknowledge from the processor.

FIG. 8 is a flowchart illustrating operation of one embodiment of a control unit shown in FIG. 4 is response to receiving specific end of interrupt (SEOI) from the processor.

FIG. 9 is a flowchart illustrating operation of one embodiment of a virtual machine manager (VMM) in response to the processor intercepting an interrupt during execution of a guest.

FIG. 10 is a flowchart illustrating operation of one embodiment of the VMM in response to the processor intercepting an end of interrupt during execution of a guest.

FIG. 15 is a flowchart illustrating operation of one embodiment of the interrupt control unit in response to detecting an exit guest condition.

FIG. 16 is a flowchart illustrating operation of one embodiment of the interrupt control unit in response to detecting an interrupt (either virtual or physical).

FIG. 17 is a flowchart illustrating operation of one embodiment of the processor in response to an access to a task priority register (TPR) in the interrupt controller.

Figure 1:
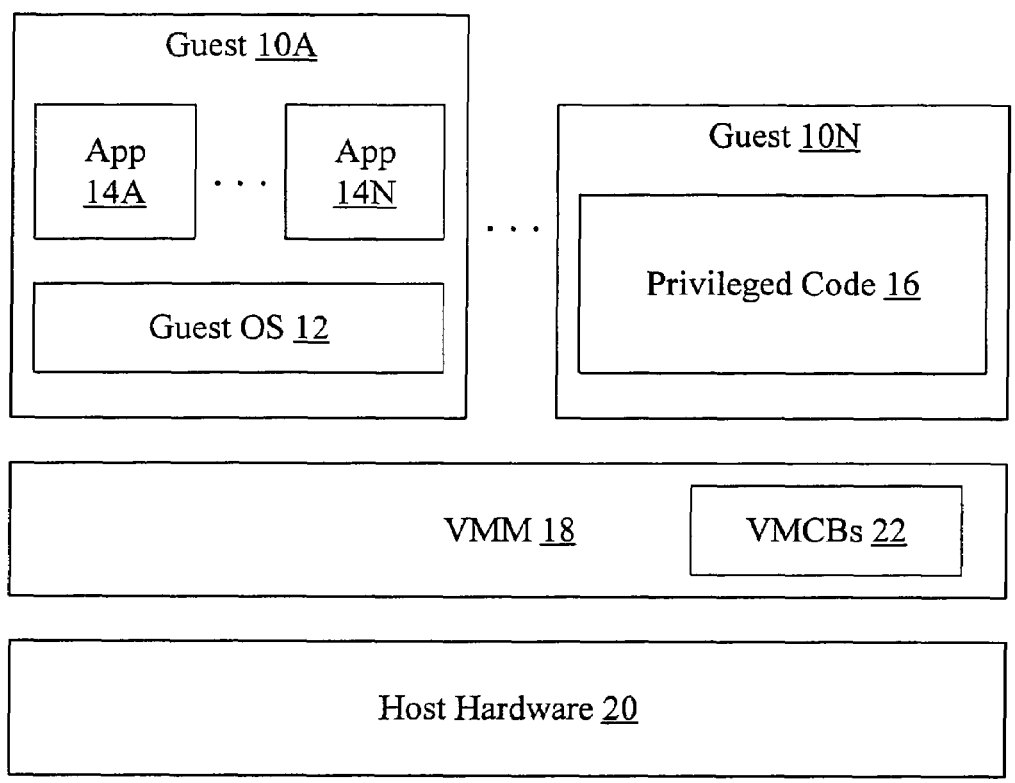
FIG. 1 is a block diagram of one embodiment of a computer system that implements virtualization.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Virtualization Overview

Turning now to FIG. 1, a block diagram of one embodiment of a computer system 5 that implements virtualization is shown. In the embodiment of FIG. 1, multiple guests 10A-10N are shown. Guest 10A includes a guest operating system (OS) 12 and one or more applications 14A-14N that run on the guest OS 12. Guest 10N includes privileged code 16. The guests 10A-10N are managed by a virtual machine manager (VMM) 18. The VMM 18 and the guests 10A-10N execute on host hardware 20, which may comprise the physical hardware included in the computer system 5. In one embodiment, the VMM 18 may maintain a set of virtual machine control blocks (VMCBs) 22. There may be one VMCB 22 for each guest 10A-10N. While the VMCBs 22 are shown as part of the VMM 18 for illustration in FIG. 1, the VMCBs 22 may be stored in memory and/or on non-volatile media such as disk drives in the host hardware 20.

The host hardware 20 generally includes all of the hardware included in the computer system 5. In various embodiments, the host hardware 20 may include one or more processors, memory, peripheral devices, and other circuitry used to coupled the preceding components. For example, common personal computer (PC)-style systems may include a Northbridge coupling the processors, the memory, and a graphics device that uses the advanced graphic port (AGP) interface. Additionally, the Northbridge may couple to a peripheral bus such as the peripheral component interface (PCI) bus, to which various peripheral components may be directly or indirectly coupled. A Southbridge may also be included, coupled to the PCI bus, to provide legacy functionality and/or couple to legacy hardware. In other embodiments, other circuitry may be used to link various hardware components. For example, HyperTransport™ (HT) links may be used to link nodes, each of which may include one or more processors, a host bridge, and a memory controller. The host bridge may be used to couple, via HT links, to peripheral devices in a daisy chain fashion. Any desired circuitry/host hardware structure may be used.

In some embodiments, one or more components of the host hardware may include hardware support for virtualization. For example, the processor(s) may include hardware support for virtualization, as will be described in more detail below. Additionally, in one embodiment, the host hardware 20 may include one or more interrupt controllers that include hardware support for virtualization.

The VMM 18 may be configured to provide the virtualization for each of the guests 10A-10N, and may control the access of the guests 10A-10N to the host hardware 20. The VMM 18 may also be responsible for scheduling the guests 10A-10N for execution on the host hardware 20. The VMM 18 may be configured to use the hardware support provided in the host hardware 20 for virtualization.

In some embodiments, the VMM 18 may be implemented as a "thin" standalone software program that executes on the host hardware 20 and provides the virtualization for the guests 10A-10N. Such a VMM implementation may sometimes be referred to as a "hypervisor". In other embodiments, the VMM 18 may be integrated into or execute on a host OS. In such embodiments, the VMM 18 may rely on the host OS, including any drivers in the host OS, platform system management mode (SMM) code provided by the system BIOS, etc. Thus, the host OS components (and various lower-level components such as the platform SMM code) execute directly on the host hardware 20 and are not virtualized by the VMM 18.

In various embodiments, the VMM 18 may support full virtualization, para-virtualization, or both. Furthermore, in some embodiments, the VMM 18 may concurrently execute guests that are paravirtualized and guests that are fully virtualized.

With full virtualization, the guest 10A-10N is not aware that virtualization is occurring. Each guest 10A-10N may have contiguous, zero based memory in its virtual machine, and the VMM 18 may use shadow page tables to remap from guest virtual addresses to host physical addresses (effectively the remapping the guest "physical address" assigned by memory management software in the guest 10A-10N to host physical address). Using the shadow page tables for each guest 10A-10N, the VMM 18 may ensure that guests do not access other guest's physical memory in the host hardware 20. In one embodiment, in full virtualization, guests 10A-10N do not directly interact with the peripheral devices in the host hardware 20.

With para-virtualization, guests 10A-10N may be at least partially VM-aware. Such guests 10A-10N may negotiate for memory pages with the VMM 18, and thus remapping guest physical addresses to host physical addresses may not be required. In one embodiment, in paravirtualization, guests 10A-10N may be permitted to directly interact with peripheral devices in the host hardware 20. At any given time, a peripheral device may be "owned" by a guest or guests 10A-10N. In one implementation, for example, a peripheral device may be mapped into a protection domain with one or more guests 10A-10N that currently own that peripheral device. Only guests that own a peripheral device may directly interact with it. There may also be a protection mechanism to prevent devices in a protection domain from reading/writing pages allocated to a guest in another protection domain (e.g. using device exclusion vectors for each protection domain that define which physical pages are accessible to the device and which are not).

As mentioned previously, the VMM 18 may maintain a VMCB 22 for each guest 10A-10N. The VMCB 22 may generally comprise a storage area that is allocated by the VMM 18 for the corresponding guest 10A-10N. In one embodiment, the VMCB 22 may comprise a page of memory, although other embodiments may use larger or smaller memory areas and/or may use storage on other media such as non-volatile storage. In one embodiment, the VMCB 22 may include the guest's processor state, which may be loaded into a processor in the host hardware 20 when the guest is scheduled to execute and may be stored back to the VMCB 22 when the guest exits (either due to completing its scheduled time, or due to one or more intercepts that the processor detects while executing the guest). In some embodiments, only a portion of the processor state is loaded via the instruction that transfers control to the guest corresponding to the VMCB 22 (the "start virtual machine (SVM)" instruction), and other desired state may be loaded by the VMM 18 prior to executing the SVM instruction. Similarly, in such embodiments, only a portion of the processor state may be stored to the VMCB 22 by the processor on guest exit and the VMM 18 may be responsible for storing any additional state as needed. In other embodiments, the VMCB 22 may include a pointer to another memory area where the processor state is stored.

In one embodiment, the VMM 18 may also have an area of memory allocated to store the processor state corresponding to the VMM 18. When the SVM is executed, the processor state corresponding to the VMM 18 may be saved in the area. When the guest exits, the processor state from the area may be reloaded from the area to permit the VMM 18 to continue execution. In one implementation, for example, the processor may implement a register (e.g. a model specific register, or MSR) to store the address of the VMM 18 save area.

In one embodiment, the VMCB 22 may also include a set of intercept indications, one indication for each intercept event that the processor supports. The intercept indication may indicate whether or not the processor is to intercept the corresponding event. As used herein, an event is "intercepted" in a guest if, should the event occur in the guest, the processor exits the guest for processing of the event (or other processing) in the VMM 18. Thus, in this embodiment, the VMM 18 may configure the processor to intercept only those events that the VMM 18 does not wish the guest 10A-10N to handle internally. Events may include instructions (that is, intercept an instruction instead of executing it), interrupts, exceptions, and/or any other desired events that may occur during guest execution. In other embodiments, the processor may enter a guest mode and intercept on all events supported by the processor.

In one embodiment, the VMCB 22 may further include other control bits that may cause the processor to perform certain actions upon loading the VMCB 22. For example, the control bits may include indications to flush the TLB in the processor. Other control bits may specify the execution environment for the guest (e.g. interrupt handling modes, an address space identifier for the guest, etc.). Still other control bits may be used to communicate an exit code describing why the guest exited, etc.

Generally, a "guest" may comprise any one or more software programs that are to be virtualized for execution in the computer system 5. A guest may include at least some code that executes in privileged mode, and thus expects to have full control over the computer system on which it is executing. As mentioned previously, guest 10A is an example in which the guest includes a guest OS 12. The guest OS 12 may be any OS, such as any of the Windows OSs available from Microsoft Corp., (Redmond, Wash.), any UNIX-type operating system such as Linux, AIX from IBM Corporation (Armonk, N.Y.), Solaris from Sun Microsystems, Inc. (Santa Clara, Calif.), HP-UX from Hewlett-Packard Company (Palo Alto, Calif.), etc. The guest 10N is an example of a guest that comprises non-OS privileged code 16.

It is noted that the letter "N" when used herein in reference numerals such as 10N is meant to generically indicate any number of elements bearing that reference numeral (e.g. any number of guests 10A-10N, including one guest). Additionally, different reference numerals that use the letter "N" (e.g. 10N and 14N) are not intended to indicate like numbers of the different elements are provided (e.g. the number of guests 10A-10N may differ from the number of applications 14A-14N) unless otherwise noted.

Interrupt Handling

Figure 2:
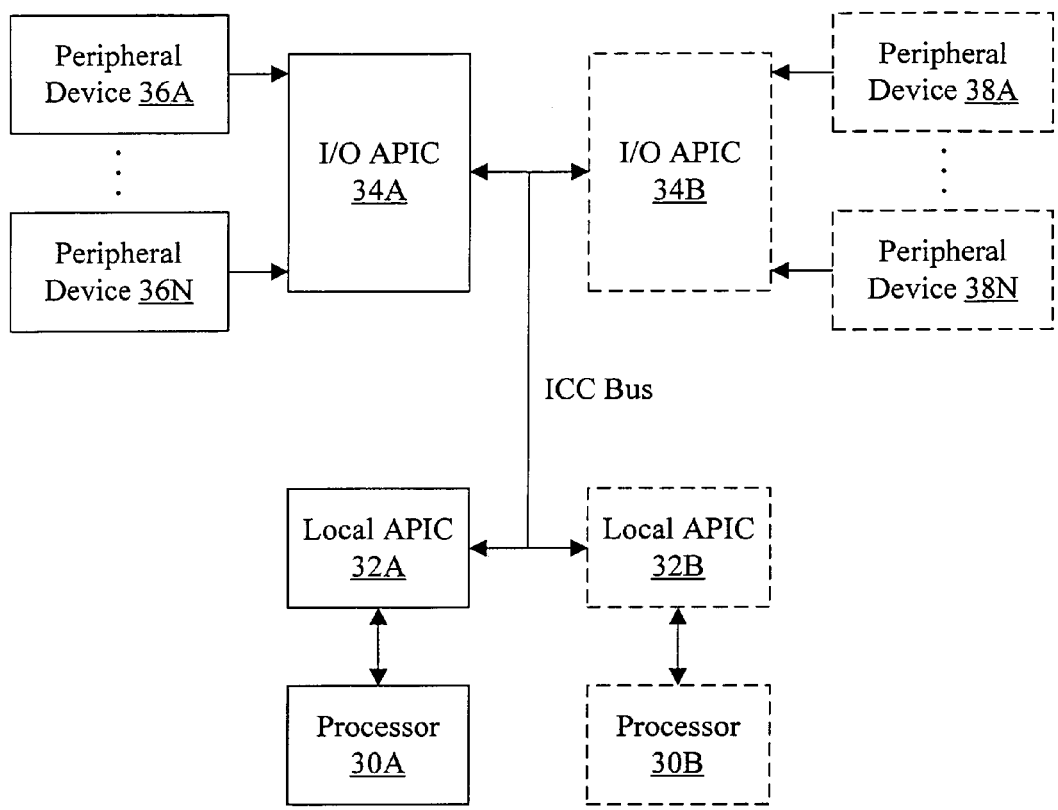
FIG. 2 is a block diagram of a portion of one embodiment of the host hardware shown in FIG. 1.

Virtualization support for interrupt handling is next described. An overview of the interrupt structure for one embodiment of the host hardware 20 is shown in FIG. 2. Described below with respect to FIGS. 3-10 is an embodiment of an interrupt controller that includes hardware support for sharing the interrupt controller among multiple guests, along with operation of an embodiment of the VMM 18 to use the support. Described below with respect to FIGS. 11-18 is an embodiment of a processor that provides hardware support for injecting virtual interrupts into a guest, along with operation of an embodiment of the VMM 18 to use the support. In various embodiments, the interrupt controller and the processor may be used together. Alternatively, in other embodiments, the interrupt controller may be used with a processor that does not provide hardware support for injecting interrupts. In still other embodiments, the processor may be used with an interrupt controller that does not provide hardware support to share the interrupt controller.

As used herein, an interrupt is an event signaled to the processor, asynchronous to the currently executing code, to suspend execution of the currently executing code in order to execute an interrupt service routine to service the interrupt. Servicing the interrupt generally refers to communicating with the source of the interrupt to determine the action required by the source and performing the action. The processor may suspend execution and "take" the interrupt, at which point the interrupt may be referred to as being "in service". An interrupt signaled external to the processor may also be referred to as a "physical interrupt" herein. The term "virtual interrupt" may refer to an interrupt taken while a guest is active in the processor, caused by the VMM 18. A given virtual interrupt may correspond to a physical interrupt, although in some cases the interrupt vector may be remapped by the VMM 18. In other cases, a virtual interrupt may be generated by software emulating a device (a "virtual device"), in which case the virtual interrupt is software generated and does not correspond to a physical interrupt. The virtual interrupt may be taken in response to interrupt state created by the VMM 18 and included in the guest's VMCB 22. Establishing state that causes a guest to take the interrupt at the next instruction boundary for which interrupts are enabled is referred to as "injecting an interrupt" into the guest.

The embodiments described in more detail below use the Advanced Programmable Interrupt Controller (APIC) specified by Intel Corporation (Santa Clara, Calif.) as an example of an interrupt structure/interrupt controller. However, other embodiments may implement other interrupt controllers using other specifications or protocols, as desired. Similarly, the embodiments described below use an x86 processor as an example, but other embodiments may implement other instruction set architectures.

Turning now to FIG. 2, a block diagram of a portion of one embodiment of the host hardware 20 is shown. In the embodiment of FIG. 2, the host hardware 20 includes a processor 30A, a local APIC 32A, an input/output (I/O) APIC 34A, and a set of peripheral devices 36A-36N. The host hardware 20 may optionally include a second processor 30B and corresponding local APIC 32B, in some embodiments. Still other embodiments may optionally include more than two processors and corresponding local APICs. The host hardware 20 may optionally include a second I/O APIC 34B and additional peripheral devices 38A-38N. The peripheral devices 36A-36N are coupled to the I/O APIC 34A. Similarly, the peripheral devices 38A-38N are coupled to the I/O APIC 34B. In other embodiments, more than two I/O APICS and corresponding sets of peripheral devices may be included. The processor 30A is coupled to the local APIC 32A, and similarly the processor 30B is coupled to the local APIC 32B. The local APICs 32A-32N and the I/O APICs 34A-34B are coupled to an interrupt controller communications (ICC) bus.

The I/O APICs 34A-34B receive interrupt requests from the peripheral devices to which they are coupled and are configured to map each interrupt request to a target processor (to which the interrupt is to be delivered) as well as an interrupt type. One of the interrupt types is referred to as "fixed", and in this case the interrupt is delivered as an interrupt request having a corresponding interrupt vector. The interrupt is logged in an interrupt request register (IRR) in the local APIC 32A-32B corresponding to the target processor. The position of the interrupt request in the IRR corresponds to the interrupt vector. Other interrupt types may include non-maskable interrupt (NMI), system management interrupt (SMI), legacy external interrupt (extINT), etc. Generally, the I/O APICs 34A-34B may include tables that may be programmable by software to map each interrupt to the processor/interrupt type.

The peripheral devices 36A-36N and 38A-38N may comprise any type of peripheral device that may generate an interrupt. Interrupt requests may be communicated to the I/O APIC 34A-34B in any fashion (e.g. as wires between the peripheral devices and the I/O APICs, as messages passed between the peripheral devices and the I/O APICs, etc.).

The I/O APICs 34A-34B may communicate interrupts to the desired local APIC 32A-32B (corresponding to the target processor 30A-30B) using the ICC bus. Each APIC 34A-34B and 32A-32B may be programmable with an identifier that may be used on the ICC bus to identify the destination of each message. While the ICC bus is referred to as a bus, it may generally be any type of communication medium over which interrupt messages may be passed (e.g. bus, custom communication medium, packet interface, etc.). In some cases, the ICC bus may be implemented as messages over the same physical communication interface used for non-interrupt communications (e.g. the PCI bus, the processor interface, etc.). The local APIC 32A-32B, in response to receiving a fixed interrupt from one of the I/O APICs 34A-34B, logs the interrupt as an interrupt request in the IRR as mentioned above.

The local APIC 32A-32B may attempt to deliver interrupts to the corresponding processor 30A-30B. The communication medium between the local APIC 32A-32B and the processor 30A-30B may vary from embodiment to embodiment. For example, one or more wires may be used to signal various types of interrupts (NMI, SMI, etc.). The fixed interrupts may be delivered by asserting a maskable interrupt signal (referred to as INTR in x86 processors). Other embodiments may use messages to signal the interrupts as virtual wires. Generally, a maskable interrupt is an interrupt that may be masked in some fashion according to the processor state, thus delaying when the processor takes the interrupt. For example, a flag in a register within the processor may be used to mask maskable interrupts, such that the interrupt is not taken by the processor if the flag is in the mask state. For example, in x86 processors, the interrupt flag (IF) in the extended flags (EFLAGS) register may be used to mask interrupts. If the IF flag is zero, maskable interrupts are masked.

For fixed interrupts, the local APIC 32A-32B may prioritize the interrupt requests and in-service interrupts to determine if an interrupt request should be delivered to the processor. Generally, if the highest priority interrupt request is higher priority than the highest priority in-service interrupt, the local APIC 32A-32B may deliver the requested interrupt to the processor. Additionally, a task priority register (TPR) may be programmed by software to establish the minimum priority level of interrupt that is being accepted by the processor. The local APIC 32A-32B may deliver the highest priority interrupt request if it is higher priority than the highest priority in-service interrupt and if it is higher priority than the priority indicated in the TPR. In one embodiment, the local APICs 32A-32B may also implement an interrupt mask register (EMR) to mask both the interrupt requests in the IRR and the in-service interrupts in the ISR. Such embodiments may be used to facilitate sharing the local APIC 32A-32B among multiple guests executing on the corresponding processor 30A-30B, as described in more detail below.

When the processor 30A-30B takes the interrupt, the processor may respond with an interrupt acknowledge command to the local APIC 32A-32B. The local APIC 32A-32B may remove the highest priority interrupt request from the IRR and log the interrupt as in service in an interrupt service register (ISR). The position of the in-service indication corresponding to the interrupt in the ISR may correspond to the interrupt vector of the interrupt. The processor 30A-30B may execute the interrupt service routine (or routines) to service the interrupt. The interrupt service routine may end with an end of interrupt (EOI) command to the local APIC 32A-32B to signal that the interrupt service is completed. The local APIC 32A-32B may remove the highest priority in-service interrupt from the ISR in response to the EOI command. In some embodiments, a specific EOI command (SEOI command) is provided which includes an indication that explicitly identifies the interrupt being completed (e.g. by the interrupt vector corresponding to the interrupt). In such an embodiment, the local APIC 32A-32B removes the identified interrupt from the ISR (even if the identified interrupt is not the highest priority interrupt in the ISR). The SEOI command and its use in sharing the local APIC 32A-32B is described in more detail below.

It is noted that the I/O APICs 34A-34B and/or the local APICs 32A-32B may be integrated into other circuitry in the host hardware 20. For example, in some embodiments, the local APICs 32A-32B are integrated into the Northbridge to which the corresponding processor 30A-30B is coupled. In other embodiments, the local APIC 32A-32B may be integrated with the corresponding processor 30A-30B.

As mentioned above, various commands may be transmitted from the processor 30A-30B to the corresponding local APIC 32A-32B (e.g. the interrupt acknowledge command, the EOI command, the SEOI command, etc.). Generally, such commands may be referred to as "interrupt commands". The commands may be generated and transmitted in any fashion. For example, the processor may generate the commands by executing instructions that write a register (either directly in the local APIC, memory mapped to the local APIC so the processor executes a store to the memory address, a write to a model specific register (MSR) that is mapped to the local APIC, a write to a control register that is mapped to the local APIC, etc.). As another example, the processor may also support specific instructions that are defined to cause the corresponding interrupt command when executed. Any combination of the above may be used. Furthermore, commands may be communicated in any fashion (e.g. over a private interface between the local APIC and the processor, over the same interface used by the processor to communicate with other devices, etc.).

Interrupt Controller Sharing

Figure 3:
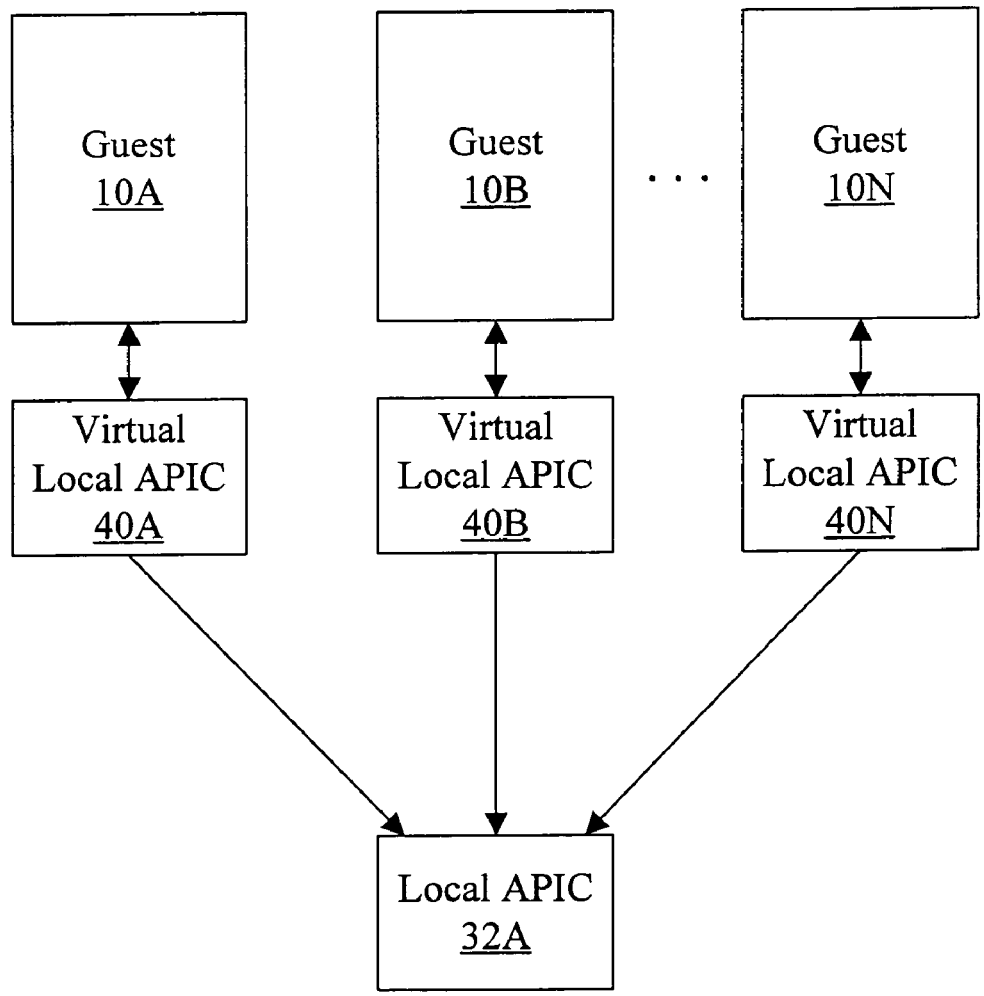
FIG. 3 is a block diagram of one embodiment of several guests, virtual local advanced programmable interrupt controllers (APICs) for each guest, and a local APIC.

Turning now to FIG. 3, a block diagram is shown illustrating multiple guests 10A-10N that may be executed on the processor 30A and corresponding virtual local APICs 40A-40N for one embodiment. The virtual local APICs 40A-40N are mapped onto the shared physical local APIC 32A that corresponds to the processor 30A.

Some of the guests 10A-10N may directly interact with one or more peripheral devices 36A-36N and 38A-38N, and thus may service interrupts from such peripheral devices. Each of the guests 10A-10N that directly interact with a peripheral device may have a corresponding virtual local APIC 40A-40N. The virtual local APICs 40A-40N may be software models of the local APIC 32A. Each virtual local APIC 40A-40N may contain the interrupts to be serviced by the respective guest 10A-10N. The software models may be maintained by the VMM 18. For example, the software models may comprise data structures that represent the requested and in-service interrupts. The data structures may store the interrupt requests and in-service interrupts in a format similar to the physical IRR and ISR registers, or may use any other convenient format.

By intercepting the physical interrupts, the VMM 18 may analyze the physical interrupt, determine which guest 10A-10N should service the interrupt ("map" the interrupt to a guest), and update the corresponding virtual local APIC 40A-40N to reflect the interrupt request. The VMM 18 may further model the local APIC 32A behavior by injecting the highest priority interrupt request into the guest, if a higher priority interrupt is not already in-service in the guest, etc. By intercepting the EOI commands from the guests 10A-10N, the VMM 18 may update the local virtual APIC 40A-40N to clear a completed interrupt (and possibly inject another interrupt, etc.).

Since the guests 10A-10N actually share the same physical local APIC 32A, some issues may arise. For example, a first guest 10A-10N that receives a high priority physical interrupt may block lower priority physical interrupts in the local APIC 32A that belong to other guests 10A-10N until the first guest completes servicing of the high priority physical interrupt. If the first guest is "buggy" or malicious, the first guest might not complete the interrupt service for a long period of time (or might not ever complete the interrupt service), which would delay or even lock out the other guests.

The local APIC 32A may implement the IMR mentioned above, and the VMM 18 may mask an interrupt when that interrupt is captured and recorded in the virtual local APIC 40A-40N of the guest to which that interrupt is mapped. The local APIC 32A may mask both the interrupt requests and the in-service interrupts that are masked in the IMR, thus permitting lower priority interrupts to be delivered to the processor 30A. That is, the local APIC 32A may deliver the highest priority interrupt request that is not masked in the IMR (assuming there is no higher priority and non-masked interrupt in service).

In some cases, the lower priority interrupt delivered due to the masking of higher priority interrupt requests and in-service interrupts may be mapped to the same guest as one of the higher priority interrupt requests or in-service interrupts. In such cases, the VMM may update the virtual local APIC 40A-40N corresponding to the guest to which the interrupt is mapped to record the interrupt request. The interrupt request may then be serviced in the guest at a later time when the higher priority interrupts have been completed.

In other cases, the lower priority interrupt may be delivered to a different guest, which is not currently servicing a higher priority interrupt and does not have a higher priority interrupt request pending. In such cases, the guest may have the interrupt injected the next time that the guest is executed (assuming the guest is not internally masking interrupts). In some embodiments, the interrupts for other guests may be injected earlier in time than would be the case if the masking were not performed.

Figure 4:
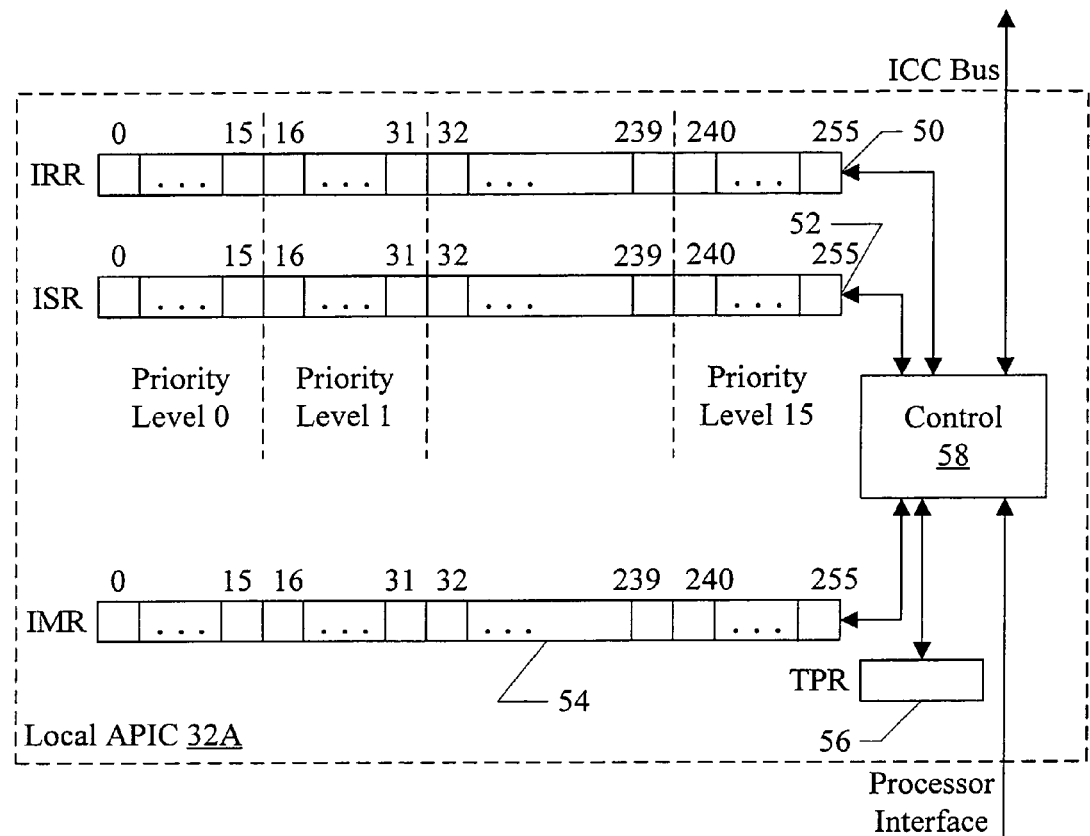
FIG. 4 is a block diagram of one embodiment of a portion of a local APIC.

Turning next to FIG. 4, a block diagram of a portion of one embodiment of the local APIC 32A is shown. The portion illustrated in FIG. 4 corresponds to fixed interrupt processing. The local APIC 32B may be similar, if included in a given embodiment. In the embodiment of FIG. 4, the local APIC 32A includes the IRR 50, the ISR 52, the IMR 54, the TPR 56, and a control unit 58. The control unit 58 is coupled to the IRR 50, the ISR 52, the IMR 54, and the TPR 56. Additionally, the control unit 58 is coupled to the ICC bus to communicate with the I/O APICs 34A-34B and the local APIC 32B, and to the processor interface to communicate with the processor 30A.

Each of the IRR 50, the ISR 52, and the IMR 54 include a location corresponding to each interrupt vector supported by the local APIC 32A. In the illustrated embodiment, vectors 0 through 255 are supported. The interrupt vector number may also be indicative of its relative priority with other interrupts (e.g. higher vector numbers are higher priority than lower vector numbers, or vice versa in other embodiments). For each interrupt vector, the IRR 50 stores an interrupt request bit indicating whether or not an interrupt is requested at that interrupt vector. For example, the indication may be a bit indicative of a request when set and indicative of no request when clear. Similarly, for each interrupt vector, the ISR 52 stores an in-service bit indicative of whether or not an interrupt is in service for that interrupt vector (e.g. indicative of an in-service interrupt when set and no in-service interrupt when clear). For each interrupt vector, the IMR 54 stores a mask bit indicative of whether or not the interrupt is masked (e.g. indicative of no masking when set and masking when clear). Thus, the masking may be accomplished by logically ANDing the mask bit with the corresponding interrupt request bit and the corresponding in-service bit for the present embodiment. For each of the IRR 50, the ISR 52, and the IMR 54, the bit location in the register is equal to the interrupt vector number that corresponds to the interrupt.

The control unit 58 may receive an interrupt request from the I/O APICs 34A-34B. FIG. 5 is a flowchart illustrating the operation of one embodiment of the control unit 58 in response to receiving an interrupt request. Responsive to receiving the interrupt request, the control unit 58 may set the interrupt request bit in the IRR 50 corresponding to the interrupt vector identified by the I/O APIC 34A-34B (block 60 in FIG. 5).

In the illustrated embodiment, the interrupts are logically arranged into groups which are assigned priority levels for determining if a pending interrupt request is to be delivered to the processor. For example, interrupt vectors 0 to 15 are assigned priority level 0, interrupt vectors 16 to 31 are assigned priority level 1, etc. up to interrupt vectors 244 to 255 at priority level 15. In this embodiment, increasing priority level numbers indicate higher priority level. The control unit 58 may compute a request priority level, which is the highest priority level for which at least one interrupt request is pending in the IRR 50. The control unit 48 may also compute an in-service priority level, which is the highest priority level for which at least one interrupt is indicated as in service in the ISR 52. The control unit 48 may deliver an interrupt if the request priority level exceeds the in-service priority level and also exceeds the priority level indicated in the TPR 56. In the present embodiment, the control unit 48 masks both the interrupt request bits and the in-service bits with the corresponding mask bits from the IMR 54 to determine the request priority level and the in-service priority level.

FIG. 6 is a flowchart illustrating operation of one embodiment of the control unit 58 to determine whether or not to deliver an interrupt (and which interrupt to deliver). The control unit 58 masks the IRR 50 and the ISR 52 with the IMR 54 (block 62). The control unit 58 may, for example, perform a bitwise logical AND of each mask bit with the corresponding bit in the IRR and in the ISR. The control unit 58 may determine a priority level of the highest priority interrupt in the masked IRR (the request priority level) and a priority level of the highest priority interrupt in the masked ISR (the in-service priority level). If the request priority level exceeds the priority level of the TPR and the in-service priority level (decision block 64, "yes" leg), the control unit 58 may deliver an interrupt to the processor (block 66). Otherwise, the control unit 48 may not deliver an interrupt to the processor (decision block 64, "no" leg).

It is noted that, while masking is performed by logically ANDing the mask bit with the corresponding interrupt request bit and in-service bit, other embodiments may perform masking in other fashions depending on the definition of the mask indication, the interrupt request indication, and the in-service indication. Generally, if an interrupt request is masked, there appears to be no request for the corresponding interrupt for interrupt delivery decision-making. Similarly, if an in-service indication is masked, there appears to be no corresponding interrupt in service for interrupt delivery decision-making.

The control unit 58 may receive an interrupt acknowledge command from the processor 30A in response to the processor 30A taking the interrupt. FIG. 7 is a flowchart illustrating operation of one embodiment of the control unit 58 in response to an interrupt acknowledge command from the processor. The control unit 58 may respond to the interrupt acknowledge command with the interrupt vector for the highest priority non-masked interrupt request (block 68). That is, the control unit 58 may mask the IRR 50 and select the highest priority interrupt request in the masked result. The control unit 48 may clear the request bit corresponding to the interrupt request in the IRR 50 (block 70) and may set the in-service bit in the ISR 52 corresponding to the interrupt request (indicating that the interrupt is now in service—block 72).

The control unit 48 may also receive an SEOI command from the processor 30A (e.g. at the end of the interrupt service routine executed by the processor 30A). FIG. 8 is a flowchart illustrating operation of one embodiment of the control unit 58 in response to the SEOI command. As previously mentioned, the SEOI command includes an explicit indication of the interrupt that is being completed with the SEOI command (e.g. the interrupt vector). The control unit 58 may clear the bit in the ISR 52 that corresponds to the identified interrupt (block 74).

It is noted that, while 256 interrupt vectors are supported in 16 priority level groups in the illustrated embodiment, more or fewer interrupt vectors and/or more or fewer priority level groups may be supported in other embodiments. In is further noted that, while the above description described interrupt request bits that indicate an interrupt request when set and no request when clear, other embodiments may assign the opposite meanings to the states of the bit. In still other embodiments, a multi-bit indication may be used. Similarly, the in-service bit may have the opposite meanings assigned to its states, or a multi-bit indication may be used. The mask bit may also have the opposite meanings assigned to its states, or a multi-bit indication may be used. For the remainder of this disclosure, the interrupt request bit, in-service bit and mask bit as described above will be used as an example, but other embodiments may use other indications. It is further noted that the interrupts described above, generated by the peripheral devices and managed by the I/O APICs 34A-34B and the local APICs 32A-32B, are physical interrupts. Since there was no confusion in the above discussion with virtual interrupts, the term "interrupt" was used.

FIGS. 9 and 10 are flowcharts illustrating operation of one embodiment of a VMM 18 that may use the IMR register 54 to share the local APIC 32A among two or more guests 10A-10N. The VMM 18 may comprise instructions which, when executed (e.g. on the processor 30A), implement the operation shown in FIGS. 9 and 10. In other embodiments, the VMM 18 may be implemented in hardware, or in a combination of hardware and software, as desired.

FIG. 9 illustrates operation of the VMM 18 in response to a physical interrupt that is intercepted by the processor 30A while a guest is being executed. Similar operation may be performed if the VMM 18 itself is interrupted with a physical interrupt.

The VMM 18 may issue an interrupt acknowledge command to the local APIC 32A, to receive the interrupt vector for the interrupt (block 80). The VMM 18 may update the IMR 54 to mask the interrupt identified by the interrupt vector (block 82). For example, the VMM 18 may clear the mask bit corresponding to the interrupt vector in the IMR 54. The VMM 18 may map the interrupt to the guest 10A-10N that is to service the interrupt (e.g. by determining which guest 10A-10N currently "owns" the peripheral device 36A-36N or 38A-38N that sourced the interrupt—block 84). The VMM 18 may update the virtual local APIC 40A-40N corresponding to the guest 10A-10N to which the interrupt is masked, recording the interrupt request (block 86). In some embodiments, the VMM 18 translates the interrupt vector number to a different vector number used by the guest. Other embodiments may use the same vector number in the guest and no translation may be performed. The VMM 18 may inject the interrupt (or a higher priority interrupt already recorded in the virtual local APIC 40A-40N) into the guest as a virtual interrupt (block 88). In some embodiments, the VMM 18 may inject the virtual interrupt by modifying the state of the virtual machine for the guest as described in the background. In other embodiments in which the processor 30A implements hardware support for injecting a virtual interrupt into a guest, the VMM 18 may use the hardware mechanism.

FIG. 10 illustrates operation of the VMM 18 in response to an EOI command intercepted by the processor 30A while a guest is being executed.

The VMM 18 may update the virtual local APIC 40A-40N corresponding to the guest that executed the EOI, clearing the highest priority virtual interrupt that has successfully been taken in the corresponding guest 10A-10N (block 90). Since the virtual local APIC 40A-40N and the guest 10A-10N follow the standard APIC protocol, in one embodiment, the highest priority interrupt is known to correspond to the EOI command. In some embodiments, the VMM 18 may translate the vector number from the virtual local APIC 40A-40N to the physical vector number of the corresponding physical interrupt. Other embodiments may use the same vector number in the guest and no translation may be performed. The VMM 18 may issue an SEOI command to the local APIC 32A to clear the corresponding interrupt from the local APIC 32A's ISR 52 (block 92). Additionally, the VMM 18 may update the IMR 54 in the local APIC 32A to unmask the corresponding interrupt (block 94). For example, the VMM 18 may set the mask bit corresponding to the physical interrupt vector in the IMR 54. The VMM 18 may examine the virtual local APIC 40A-40N to determine if another interrupt request is pending for the guest 10A-10N. If another request is pending (decision block 96, "yes" leg), the VMM 18 may inject the virtual interrupt into the guest (block 88). Injecting the virtual interrupt in response to an SEOI command may be similar to injecting the virtual interrupt in response to receiving a physical interrupt (in FIG. 9).

Processor Support for Virtual Interrupt Injection

Figure 11:
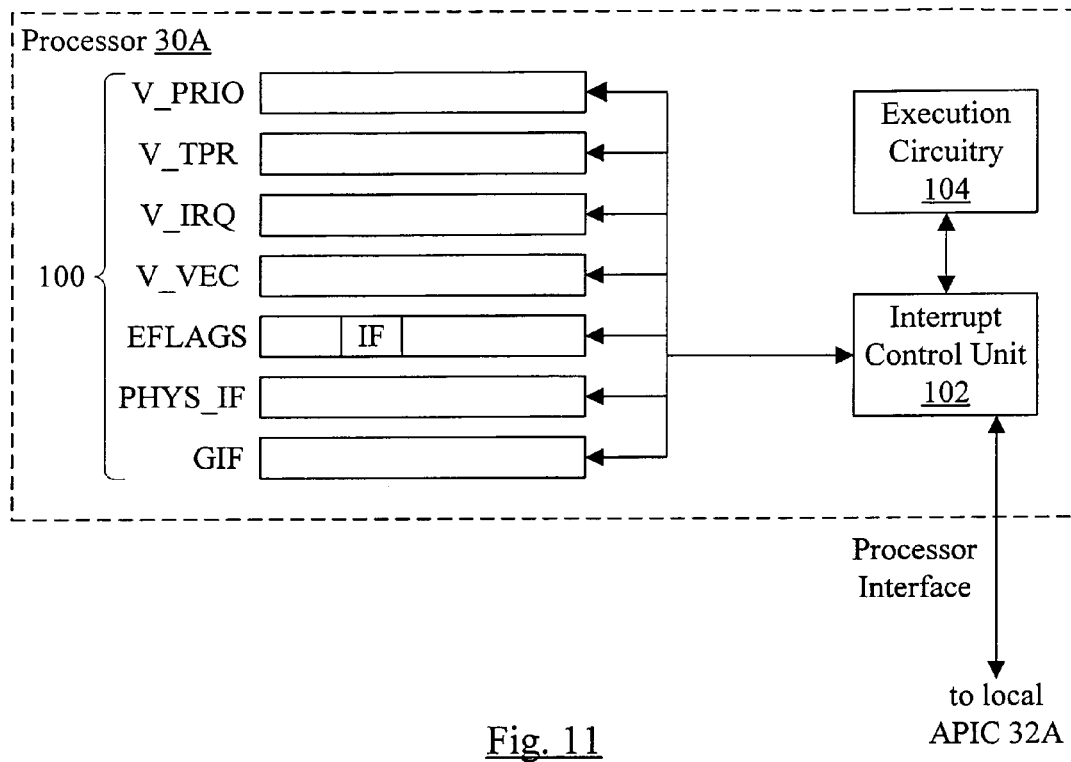
FIG. 11 is a block diagram of one embodiment of a portion of a processor.

Turning next to FIG. 11, a block diagram of a portion of one embodiment of the processor 30A is shown. The processor 30B, if included, may be similar. In the embodiment of FIG. 11, the processor 30A includes one or more interrupt control registers 100, an interrupt control unit 102, and execution circuitry 104. The interrupt control unit 102 is coupled to the registers 100, the execution circuitry 104, and the processor interface to the local APIC 32A.

The interrupt control registers 100 may store an interrupt state describing a virtual interrupt to be taken by the processor 30A while the processor 30A is executing a guest. Generally, the interrupt state may comprise one or more values that cause the processor 30A to initiate an interrupt. The interrupt state may further include values that describe the interrupt to be taken, such that the processor 30A may redirect execution to the interrupt service routine that is appropriate for the virtual interrupt. Thus, responsive to the interrupt state provided in the interrupt control registers 100, the processor 30A may initiate an interrupt. The interrupt may be initiated without requiring an external signal (such as from an interrupt controller).

In the illustrated embodiment, the interrupt state includes a virtual interrupt request (V_IRQ). The V_IRQ may be, for example, a bit that indicates a virtual interrupt request when set and indicates no virtual interrupt request when clear. In other embodiments, the opposite meanings may be assigned to the states of the bit or multibit indications may be used. Responsive to the V_IRQ (and if virtual interrupts are not masked in the guest), the processor 30A may take a virtual interrupt.

The interrupt state may further include various values that identify the specific interrupt to be taken. For example, in the illustrated embodiment, the virtual interrupt priority (V_PRIO) and the virtual interrupt vector (V_VEC) may be provided. The V_PRIO may be the priority level of the virtual interrupt, for comparison to the TPR. The virtual interrupt vector may be the interrupt vector used for the interrupt. Accordingly, when taking a virtual interrupt, the processor 30A may read the V_VEC rather than issuing an interrupt acknowledge command to the interrupt controller.

In one embodiment, the processor 30A also implements a virtual TPR (V_TPR) that may be read/written by the guest executing on the processor 30A. The processor 30A may compare the V_TPR to the V_PRIO to determine if the virtual interrupt is to be taken. The comparison may also be overridden by setting the V_IGN_TPR bit, as described in more detail below.

The interrupt control registers 100 may further include various interrupt enable/masking flags that may be used to control whether or not the processor 30A is to take interrupts. For example, the EFLAGS register is shown in FIG. 11 (which is defined in the x86 instruction set architecture). The EFLAGS register includes an interrupt flag (IF) that is used to enable or mask interrupts. If the IF is 0, interrupts are masked. If the IF is 1, interrupts are enabled. The IF controls maskable interrupts. In the present embodiment, the processor 30A may use the IF to enable/mask virtual interrupts. Physical interrupts may be enabled/masked using a physical interrupt flag (PHYS_IF). Additionally, a global interrupt flag (GIF) may be defined that enables/masks both physical and virtual interrupts. The V_INTR_MASKING bit may control whether or not the interrupt masking state (IF and TPR) is virtualized. That is, the V_INTR_MASKING bit may control the guest access to the PHYS_IF and TPR.

The interrupt control unit 102 may be configured, responsive to the interrupt control registers 100 and communications from the local APIC 32A, to determine if a physical interrupt or a virtual interrupt is to be taken. Additionally, the interrupt control unit 102 may be configured to interact with the execution circuitry 104 to determine a suitable point to initiate the interrupt, and to redirect the execution circuitry 104 to the interrupt service routine. Generally, interrupts are taken at an instruction boundary. An instruction boundary is a state in which the instruction prior to the boundary in the instruction sequence being executed, as well as any preceding instructions, are fully completed in their execution and update of the processor state and the instruction subsequent to the boundary, as well as any following instructions, have not updated architected processor state. Thus, the processor state may be saved and execution restarted at the instruction subsequent to the boundary.

The execution circuitry 104 may include the circuitry in the processor 30A that executes instructions. The execution circuit 104 may implement any desired configuration, including scalar, superscalar, in-order, out of order, speculative, non-speculative, and/or pipelined designs.

It is noted that, while the V_PRIO, V_TPR, V_IRQ, V_VEC, EFLAGS, PHYS_IF, GIF, V_INTR_MASKING, and V_IGN_TPR are shown separately in FIG. 11, two or more of the values may be implemented as fields in the same interrupt control register, as desired. Any combination of one or more interrupt control registers 100, storing any combination of values as fields therein, may be used. The EFLAGS register may be an architected register in the x86 instruction set architecture, and may also store various other flags not related to interrupt control. The other registers may be implemented as any combination of architected registers, control registers, model specific registers, etc. It is further noted that, while the interrupt state is loaded into the interrupt control registers 100 in this embodiment, other embodiments may or may not load the interrupt state into registers.

The interrupt state supported by the processor 30A for permitting virtual interrupts to be injected into a guest may be stored in the VMCB 22 corresponding to the guest. Thus, the VMM 18 may store the interrupt state in the VMCB 22 of a guest in order to inject an interrupt into that guest. When the guest is started on the processor 30A, the interrupt state may be loaded from the VMCB 22 into the processor 30A.

Figure 12:
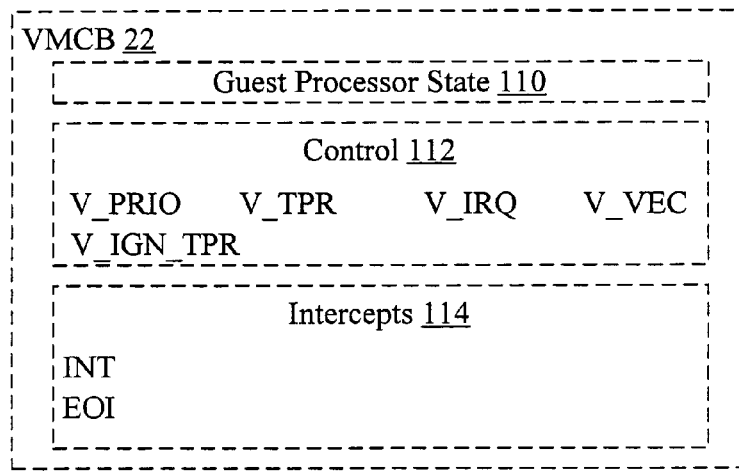
FIG. 12 is a block diagram illustrating one embodiment of a virtual machine control block (VMCB).

FIG. 12 is a block diagram of one embodiment of a VMCB 22. In the embodiment of FIG. 12, the VMCB 22 may include a guest processor state 110, control data 112, and intercepts 114. As mentioned previously, the guest processor state 110 may include various architected state that corresponds to the processor state at the point at which the guest last exited. The guest processor state 110 may also include implementation-specific state (e.g. model specific registers). For example, the guest processor state 110 may include implementation-specific state and/or architected state that is considered part of the processor's context. The guest processor state 110 may correspond to an initial state of the processor if the guest has not yet executed. The guest processor state 110 may be defined to store all the processor state that is included in the context, in some embodiments. In other embodiments, the guest processor state 110 may not be defined to store all processor state. Processor state not stored in the guest processor state 110 may be saved by the VMM 18 in other memory locations (or may be recreated by the VMM 18). Any subset of processor state may be included in the guest processor state 110.

The control data 112 may include the interrupt state described above (the V_PRIO, V_TPR, V_IRQ, and V_VEC). In other embodiments, the interrupt state may be considered part of the guest processor state 110. Additionally, in some embodiments, an ignore TPR (V_IGN_TPR) control bit and a V_INTR_MASKING control bit may be provided as described in more detail below.

The intercepts 114 may specify which events are to be intercepted (causing an exit from the guest). Various intercepts may be defined in various embodiments. In the present embodiment, a physical interrupt intercept (INT) and an end of interrupt intercept (EOI) may be defined. If the INT intercept is enabled, physical interrupts cause an exit from the guest. If the EOI intercept is enabled, end of interrupt commands cause an exit from the guest. Each intercept indication may, e.g., be a bit which may enable the intercept when set or disable the intercept when clear. Other embodiments may assign the opposite meanings to the states of the bit or may use other indications.

Figure 13:
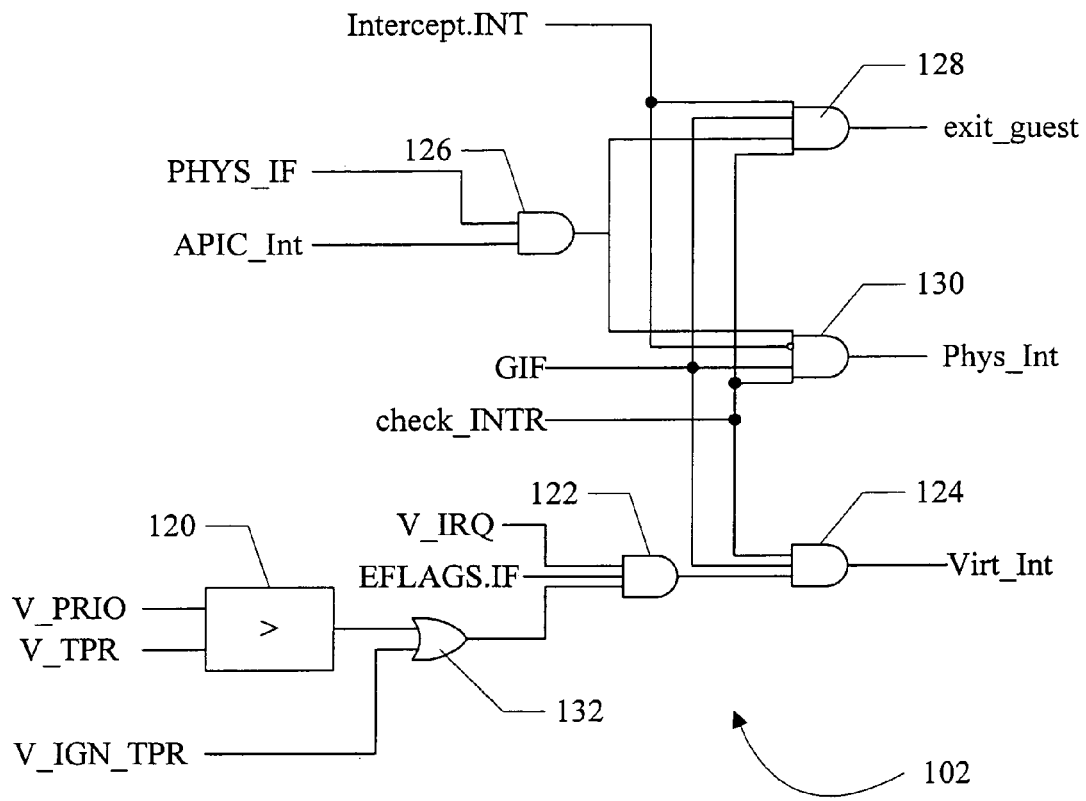
FIG. 13 is a circuit diagram illustrating operation of one embodiment of an interrupt control unit shown in FIG. 11 for generating virtual interrupts, physical interrupts, and exiting of a guest.

FIG. 13 is a circuit diagram illustrating operation of the interrupt control unit 102 for initiating physical interrupts, virtual interrupts, and exits of the guest due to a physical interrupt being signaled. The circuitry shown in FIG. 13 is intended to represent the interrupt control unit 102, and may or may not correspond to actual implementations. Furthermore, any equivalent circuitry including any Boolean equivalents of the circuitry shown may be used.

A virtual interrupt may be caused by the interrupt state in a manner similar to the corresponding values in a physical APIC. Thus, for example, the V_PRIO is compared to the V_TPR (reference numeral 120), and the interrupt may be taken if the V_PRIO exceeds the V_TPR. If the V_PRIO exceeds the V_TPR, the EFLAGS.IF is set, and the V_IRQ is set (indicating an interrupt request), then a virtual interrupt is desired (AND gate 122). The interrupt control unit 102 may initiate the virtual interrupt if the GIF is set and the execution circuitry 104 is at a state that permits an interrupt to be taken (represented by the assertion of the check_INTR signal in FIG. 13) (AND gate 124). The check_INTR signal may be asserted if an instruction boundary has been reached and any other requirements of the instruction set architecture for permitting an interrupt are met (if any). For example, in the x86 instruction set architecture, some instructions do not permit an interrupt until after the next instruction following that instruction.

The V_IGN_TPR bit may also cause a virtual interrupt even if the V_PRIO does not exceed the V_TPR in the illustrated embodiment (OR gate 132). The V_IGN_TPR may be provided to support modeling an interrupt from a legacy programmable interrupt controller (PIC) that does not have a TPR. Such interrupts are delivered from a physical APIC as an extINT instead of a fixed interrupt, and thus the TPR does not apply. The VMM 18 may set the V_IGN_TPR bit to model such behavior. In other embodiments, the V_IGN_TPR may not be implemented.

Physical interrupts delivered from the local APIC (indicated as APIC_Int in FIG. 13) are enabled by the PHYS_IF bit (AND gate 126). If an enabled physical interrupt is delivered, either an exit from the guest may occur (if interrupts are being intercepted), or the interrupt control unit 102 may initiate the physical interrupt (if interrupts are not being intercepted). Thus, exitguest in FIG. 13 is generated if an enabled physical interrupt is delivered, interrupts are being intercepted (Intercept.INT is set), the GIF is set, and the check_INTR is asserted (AND gate 128). A physical interrupt is generated if an enabled physical interrupt is delivered, interrupts are not being intercepted (Intercept.INT is clear), the GIF is set, and the check_INTR is asserted (AND gate 130).

It is noted that, while the interrupt intercept indication is used in the illustrated embodiment to select between exiting a guest and initiating a physical interrupt, other embodiments may use any other indication that a guest is being executed. For example, there may be a guest mode bit in some embodiments.

Accordingly, when a physical interrupt is delivered to the processor 30A while a guest is in execution on the processor 30A (and physical interrupts are intercepted), first an exit of the guest may occur (exit_guest), followed by initiation of the physical interrupt in the host mode (Phys_Int). If the physical interrupt is mapped to the guest that was exited, the VMM 18 may inject the corresponding virtual interrupt into the guest. Thus, the next time that the guest is scheduled and begins executing, the virtual interrupt may be initiated (Virt_Int).

In the x86 instruction set architecture, the EFLAGS.IF bit is used to enable/mask interrupts in the processor. If a guest were permitted to control physical interrupts using the IF, then the guest may prevent physical interrupts for a relatively long period of time. In the present embodiment, a guest may be prevented from using the IF to mask physical interrupts. The EFLAGS.IF bit may be defined in the processor 30A to enable/mask virtual interrupts. Physical interrupts may be controlled by the PHYS_IF bit. In one embodiment, the V_INTR_MASKING bit may be used to control whether or not the PHYS_IF bit is updated when the EFLAGS.IF bit is updated. In other embodiments, the PHYS_IF bit may be updated using a different instruction than the instruction that updates the EFLAGS.IF bit.

Figure 14:
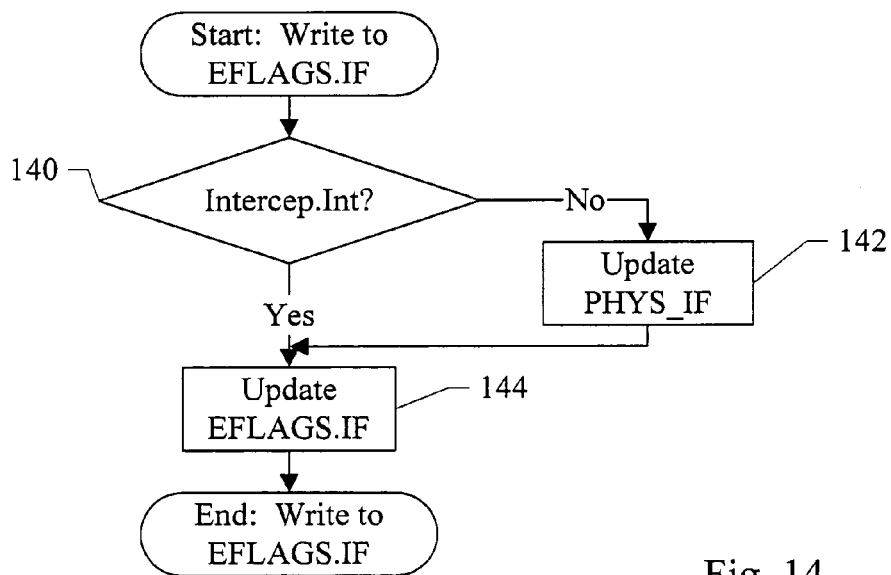
FIG. 14 is a flowchart illustrating operation of one embodiment of the processor for writing an interrupt flag in a flag register.

FIG. 14 is a flowchart illustrating operation of one embodiment of the processor 30A when a write to the EFLAGS.IF bit occurs. If the V_INTR_MASKING bit is clear, indicating that the guest may access the PHYS_IF bit and the TPR (decision block 140, "no" leg), the PHYS_IF bit is updated to the same state that the EFLAGS.IF bit is updated (block 142). In either case, the EFLAGS.IF bit is updated (block 144).

In addition to the operation shown in FIG. 13 to detect and initiate virtual interrupts, physical interrupts, and exits from a guest, the processor 30A may further be configured to perform additional functionality to exit the guest and to take virtual or physical interrupts. The additional functionality may be implemented in the interrupt control unit 102 or other circuitry in the processor 30A (or a combination of the interrupt control unit 102 and other circuitry). Such additional functionality for one embodiment is shown in FIGS. 15 and 16.

FIG. 15 illustrates additional functionality to exit a guest for one embodiment of the processor 30A. The processor 30A may save the processor state to the VMCB corresponding to the guest that is being exited (block 150). The state that is saved may include the V_IRQ state, so that whether or not a virtual interrupt is being requested at the time of guest exit is not lost. As noted previously, in some embodiments, only a subset of the processor state may be saved. The VMM 18 may save additional processor state to the VMCB 22 as needed/desired.

The processor 30A may clear the V_IRQ request and any intercepts that the processor 30A was programmed for when the guest was started (block 152). Clearing the V_IRQ may prevent a virtual interrupt from being initiated when the VMM 18 is executing. Similarly, clearing the intercepts prevents intercepts while the VMM 18 itself is executing.

The processor 30A may load processor state from a host save area (block 154). The state loaded from the host save area may correspond to the state saved to the VMCB 22, if not all of the processor state is saved and loaded automatically by the processor 30A.

FIG. 16 illustrates additional functionality that may be implemented in the processor 30A to take an interrupt (either physical or virtual). If the interrupt is physical (decision block 160, "no" leg), the processor 30A may issue an interrupt acknowledge command (INTAK) to the local APIC 32A to obtain the interrupt vector (block 162). If the interrupt is virtual (decision block 160, "yes" leg), the processor 30A may not issue the INTAK command. The processor 30A may clear the V_IRQ bit in the interrupt control registers 100 (block 164) and may read the V_VEC interrupt vector from the interrupt control registers 100 (block 166). The remainder of the interrupt processing, redirecting the processor to the interrupt service routine, may proceed in either case in the same fashion (block 168). The remainder of the processing may be dependent on the definition of the instruction set architecture implemented by the processor. For example, in the x86 instruction set architecture, the interrupt vector may be used to index an interrupt descriptor table, etc.

In some embodiments, the functionality shown in FIGS. 15 and 16 may be implemented in one or more microcode routines implemented in a microcode unit in the processor 30A. The microcode routines may comprise instruction sequences stored in a read-only memory (ROM) in the processor 30A that are fetched and executed by the execution circuitry 104. The exit_guest, Phys_Int, and Virt_Int signals in FIG. 13 may represent traps into the microcode, in such embodiments. In other embodiments, the functionality may be implemented in hardware or a combination of hardware and microcode.

An access (read or write) to the TPR in the processor 30A may access the V_TPR or the TPR in the local APIC 32A. In the present embodiment, the V_TPR may be accessed if the V_INTR_MASKING bit is set and the TPR in the local APIC 32A may be accessed if the V_INTR_MASKING bit is clear. Other embodiments may use other indications (e.g. a guest mode bit). FIG. 17 is a flowchart illustrating operation of one embodiment of the processor 30A in response to an access to the TPR. If the V_INTR_MASKING bit is set (decision block 170, "yes" leg), the V_TPR is accessed (block 172). the V_INTR_MASKING bit is clear (decision block 170, "no" leg), the APIC TPR is accessed (block 174).

Figure 18:
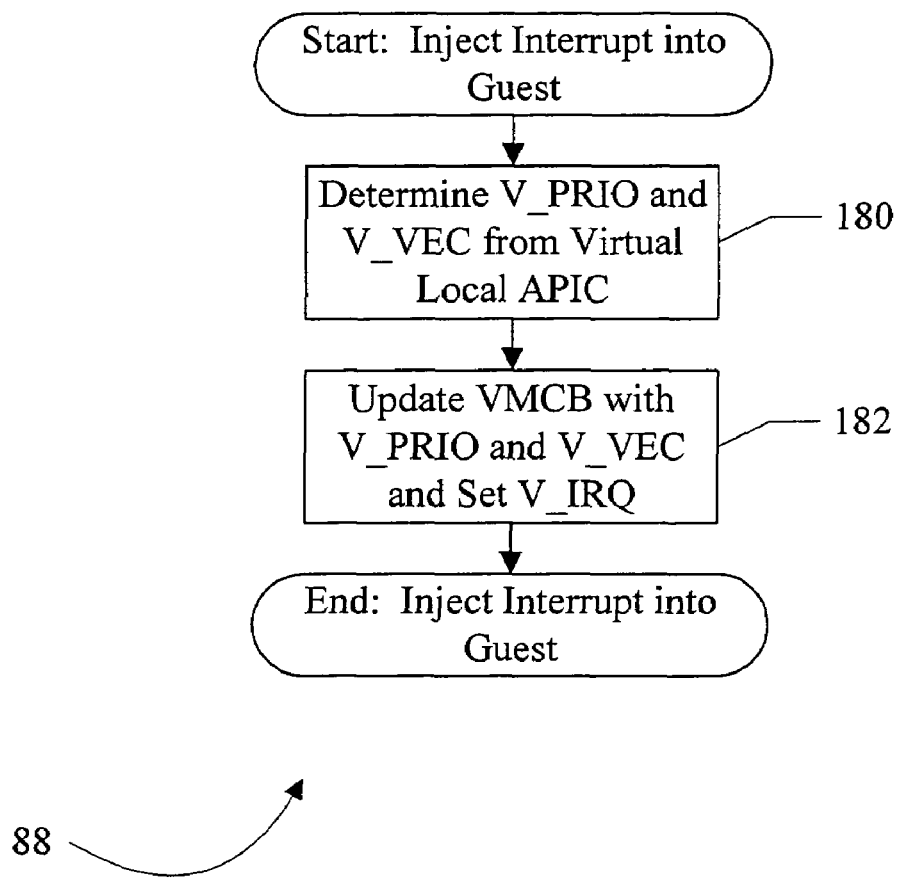
FIG. 18 is a flowchart illustrating operation of one embodiment of the VMM to inject an interrupt into a guest.

FIG. 18 is a flowchart illustrating one embodiment of the VMM 18 injecting an interrupt into a guest using the interrupt state in the VMCB 22 and the processor providing hardware support for injecting the interrupt. That is, FIG. 18 may be an implementation of block 88 in FIGS. 9 and 10.

The VMM 18 may determine the V_PRIO and the V_VEC for the virtual interrupt from the virtual local APIC 40A-40N corresponding to the guest 10A-10N (block 180). The interrupt state may represent, at a given point in time, the highest priority interrupt that is represented in the virtual local APIC 40A-40N for that guest 10A-10N (if a higher priority interrupt is not already in service in the guest). The VMM 18 may update the VMCB 22 with the V_PRIO and the V_VEC, and may set the V_IRQ bit in the VMCB 22 (block 182).

In some embodiments that support a legacy PIC, there may be a mode in the legacy PIC in which an interrupt acknowledge command is treated as an EOI ("autoEOI mode"). To model such a mode, some embodiments may also support intercepting an interrupt acknowledge command to check for other pending interrupts that may be taken due to the extINT from the legacy PIC being "completed" by the interrupt acknowledge command.

Figure 19:
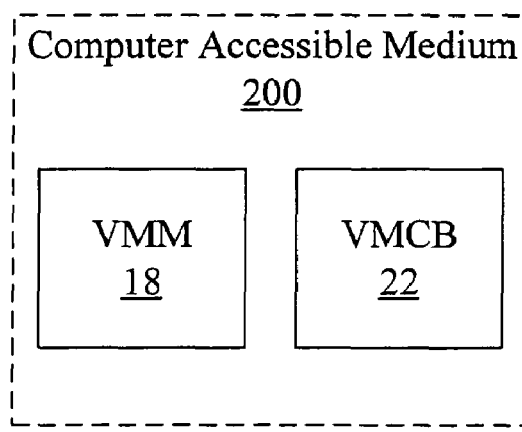
FIG. 19 is a block diagram of one embodiment of a computer accessible medium.

Turning now to FIG. 19, a block diagram of a computer accessible medium 200 is shown. Generally speaking, a computer accessible medium may include any media accessible by a computer during use to provide instructions and/or data to the computer. For example, a computer accessible medium may include storage media such as magnetic or optical media, e.g., disk (fixed or removable), tape, CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link. The computer accessible medium 200 in FIG. 19 may store one or more of the VMM 18 and a VMCB 22. The VMM 18 may comprise instructions which implement the operations described for the VMM 18 herein. Generally, the computer accessible medium 200 may store any set of instructions which, when executed, implement a portion or all of the flowcharts shown in one or more of FIGS. 9, 10, and 18. The computer accessible medium 200 may, in some embodiments, be part of the host hardware 20.

Numerous variations and modifications will become apparent to those skilled in the art once the above disclosure is fully appreciated. It is intended that the following claims be interpreted to embrace all such variations and modifications.

What is claimed is:

1. A method comprising:
  receiving an interrupt in a processor from an interrupt controller;
  mapping the interrupt to a first guest of a plurality of guests executing on the processor;
  delivering the interrupt to the first guest; and
  masking the interrupt in the interrupt controller responsive to delivering the interrupt to permit another interrupt to be transmitted by the interrupt controller to the processor, the other interrupt having a lower priority than the interrupt.

2. The method as recited in claim 1 further comprising mapping the other interrupt to a second guest of the plurality of guests.

3. The method as recited in claim 1 further comprising mapping the other interrupt to the first guest.

4. The method as recited in claim 1 further comprising maintaining a plurality of virtual interrupt controllers, each of the plurality of virtual interrupt controllers corresponding to a respective one of the plurality of guests, and wherein a first virtual interrupt controller of the plurality of virtual interrupt controllers corresponds to the first guest, and wherein the maintaining comprises updating the first virtual interrupt controller to record the interrupt.

5. The method as recited in claim 4 wherein the maintaining further comprises determining an interrupt vector corresponding to the interrupt.

6. The method as recited in claim 5 wherein the maintaining further comprises translating the interrupt vector to a virtual interrupt vector for recording in the first virtual interrupt controller.

7. The method as recited in claim 5 wherein determining the interrupt vector comprises issuing an interrupt acknowledge command to the interrupt controller.

8. The method as recited in claim 1 further comprising injecting the interrupt into the first guest.

9. The method as recited in claim 8 further comprising intercepting an end of interrupt command generated by the first guest in response to completing servicing of the interrupt.

10. The method as recited in claim 9 further comprising transmitting a second end of interrupt command on behalf of the first guest responsive to intercepting the end of interrupt command, the second end of interrupt command including an explicit indication identifying the interrupt to the interrupt controller.

11. The method as recited in claim 9 further comprising unmasking the interrupt in the interrupt controller responsive to intercepting the end of interrupt command.

12. A computer accessible medium storing a plurality of instructions comprising instructions which, when executed on a processor in response to the processor intercepting an interrupt from an interrupt controller:
  map the interrupt to a first guest of a plurality of guests executing on the processor;
  deliver the interrupt to the first guest; and
  mask the interrupt in the interrupt controller in response to delivering the interrupt to permit another interrupt to be transmitted by the interrupt controller to the processor, the other interrupt having a lower priority than the interrupt.

13. The computer accessible medium as recited in claim 12 wherein the instructions, when executed in response to the processor intercepting the other interrupt, map the other interrupt to a second guest of the plurality of guests.

14. The computer accessible medium as recited in claim 12 wherein the instructions, when executed in response to the processor intercepting the other interrupt, map the other interrupt to the first guest.

15. The computer accessible medium as recited in claim 12 wherein the plurality of instructions, when executed, maintain a plurality of virtual interrupt controllers, each of the plurality of virtual interrupt controllers corresponding to a respective one of the plurality of guests, and wherein a first virtual interrupt controller of the plurality of virtual interrupt controllers corresponds to the first guest, and wherein the instructions, when executed, update the first virtual interrupt controller to record the interrupt.

16. The computer accessible medium as recited in claim 15 wherein the instructions, when executed, determine an interrupt vector corresponding to the interrupt.

17. The computer accessible medium as recited in claim 16 wherein the instructions, when executed, translate the interrupt vector to a virtual interrupt vector for recording in the first virtual interrupt controller.

18. The computer accessible medium as recited in claim 12 wherein the instructions, when executed, inject the interrupt into the first guest.

19. The computer accessible medium as recited in claim 18 wherein the plurality of instructions comprise second instructions which, when executed in response to the processor intercepting an end of interrupt command generated by the first guest in response to completing servicing of the interrupt, initiate a second end of interrupt command on behalf of the first guest, the second end of interrupt command including an explicit indication identifying the interrupt to the interrupt controller.

20. The computer accessible medium as recited in claim 19 wherein the second instructions, when executed, unmask the interrupt in the interrupt controller.

* * * * *